United States Patent [19]
Kamitani et al.

[11] Patent Number: 5,728,274
[45] Date of Patent: Mar. 17, 1998

[54] PRODUCTION SYSTEM OF ELECTROLYZED WATER

[75] Inventors: Yoshinori Kamitani, Nagoyoa; Masahiro Fujita; Takeaki Funabashi, both of Toyoake, all of Japan

[73] Assignee: Hoshizaki Denki Kabushiki Kaisha, Toyoake, Japan

[21] Appl. No.: 689,790

[22] Filed: Aug. 13, 1996

[51] Int. Cl.$^6$ ................................................ C25C 7/00
[52] U.S. Cl. ................................... 204/228; 204/263
[58] Field of Search ........................... 204/228, 263, 204/264–266

[56] References Cited

U.S. PATENT DOCUMENTS

| | | | |
|---|---|---|---|
| 4,734,176 | 3/1988 | Zemba, Jr. et al. | 204/228 X |
| 5,037,518 | 8/1991 | Young et al. | 204/228 X |
| 5,445,722 | 8/1995 | Yamaguti et al. | 204/228 X |

FOREIGN PATENT DOCUMENTS 5-1359  1/1993  Japan.

*Primary Examiner*—Donald R. Valentine
*Attorney, Agent, or Firm*—Nikaido, Marmelstein, Murray & Oram LLP

[57] ABSTRACT

A production system of electrolyzed ion water wherein acid ion water and alkaline ion water are produced by electrolysis of water or brine between a pair of electrodes in an electrolyzer and discharged through discharge conduits for use in appropriate manner, and wherein DC voltage between the electrodes is inverted in polarity to eliminate contaminants adhered to the negative electrode in the electrolyzer. In the production system, invert ion water produced in the electrolyzer at a cleaning mode is discharged in such a manner as to be used as proper ion water, and the contaminants are eliminated without causing entry of the invert ion water into a storage tank of proper ion water.

3 Claims, 3 Drawing Sheets

PRODUCTION SYSTEM OF ELECTROLYZED WATER

BACKGROUND OF THE INVENTION

1. Field of the Invention

The present invention relates to a production system for producing acid ion water and alkaline ion water by electrolysis of water or brine in an electrolyzer.

2. Description of the Prior Art

Disclosed in Japanese Utility Model Publication 5(1993)-1359 is an apparatus for production of electrolyzed ion water wherein acid ion water and alkaline ion water are produced by electrolysis of water or brine between a pair of electrodes in an electrolyzer and discharged through discharge conduits for use in an appropriate manner. In the production apparatus, DC voltage between the electrodes is inverted in polarity to eliminate foreign contaminants such as calcium, sodium, magnesium, potassium, etc. adhered to the negative electrode in the electrolyzer thereby to electrically clean both the electrodes in the electrolyzer. During operation of the apparatus at the cleaning mode of the electrolyzer, invert ion water is produced in the electrolyzer and discharged from a bifurcated portion of the discharge conduit, while proper ion water is retained in the discharge conduit between the bifurcated portion and the outlet. As a result, the invert ion water is uselessly discharged, and the passage of the outlet conduit filled with proper ion water is reduced by contaminants such as calcium, sodium, etc. adhered thereto, finally causing choke of the outlet conduit.

SUMMARY OF THE INVENTION

It is, therefore, a primary object of the present invention to provide a production system of electrolyzed ion water wherein the invert ion water produced at the cleaning mode of the electrolyzer is discharged in such a manner as to be used as proper ion water.

A secondary object of the present invention is to provide a production system of electrolyzed ion water, having the above characteristics, wherein contaminants adhered to the discharge conduits are eliminated without causing entry of the invert ion water into a storage tank of proper ion water.

According to the present invention, the primary object is accomplished by providing a production system of electrolyzed ion water, which comprises an electrolyzer the interior of which is subdivided into first and second electrode chambers by means of a cation permeable diaphragm and is provided with first and second electrodes respectively disposed in the first and second electrode chambers, a first discharge conduit connected to the first electrode chamber to discharge ion water produced by electrolysis of water in the first electrode chamber, a second discharge conduit connected to the second electrode chamber to discharge ion water produced by electrolysis of water in the second electrode chamber, wherein the production system further comprises first and second introduction conduits arranged to be selectively connected to the first and second discharge conduits, an electrically operated changeover valve disposed within a connection portion of the first and second discharge conduits and the first and second introduction conduits to be switched over between a first position in which the first and second discharge conduits are respectively connected to the first and second introduction conduits and a second position in which the first discharge conduit is connected to the second introduction conduit while the second discharge conduit is connected to the first introduction conduit, polarity changeover means for switching over polarity of DC voltage applied to the electrodes of the electrolyzer, and control means for maintaining the changeover valve in the first position and the polarity changeover means in a deactivated condition at a production mode of ion water so that acid ion water is produced in the first electrode chamber and discharged into the first introduction conduit from the first discharge conduit while alkaline ion water is produced in the second electrode chamber and discharged into the second introduction conduit from the second discharge conduit, for switching over the changeover valve from the first position to the second position and activating the polarity changeover means upon each lapse of a predetermined time during operation at the production mode of ion water so that alkaline ion water is produced in the first electrode chamber and discharged into the second introduction conduit from the first discharge conduit while acid ion water is produced in the second electrode chamber and discharged into the first introduction conduit from the second discharge conduit, and for switching over the changeover valve from the first position to the second position or activating the polarity changeover means at a cleaning mode of the conduits so that acid ion water is discharged into the second introduction conduit while alkaline ion water is discharged into the first introduction conduit.

The secondary object of the present invention is accomplished by providing the production system of electrolyzed ion water which further comprises an electrically operated second changeover valve to be switched over between a first position in which the first introduction conduit is connected to a first storage tank of acid ion water and a second position in which the first introduction conduit is connected to a second storage tank of alkaline ion water, wherein the control means includes means for maintaining the second changeover valve in the first position during operation at the production mode of ion water, for switching over the second changeover valve from the first position to the second position and maintaining it in the second position for a predetermined time when the first-named changeover valve is switched over from the first position to the second position in a condition where the polarity changeover means has been activated during operation at the production mode of ion water, and for switching over the second changeover valve from the first position to the second position and maintaining it in the second position when only the first-named changeover valve is switched over from the first position to the second position or only the polarity changeover means is activated at the cleaning mode of the conduits.

BRIEF DESCRIPTION OF THE DRAWINGS

Other objects, features and advantages of the present invention will be more readily appreciated from the following detailed description of preferred embodiments thereof when taken together with the accompanying drawings, in which.

DESCRIPTION OF PREFERRED EMBODIMENTS

Figure 1:
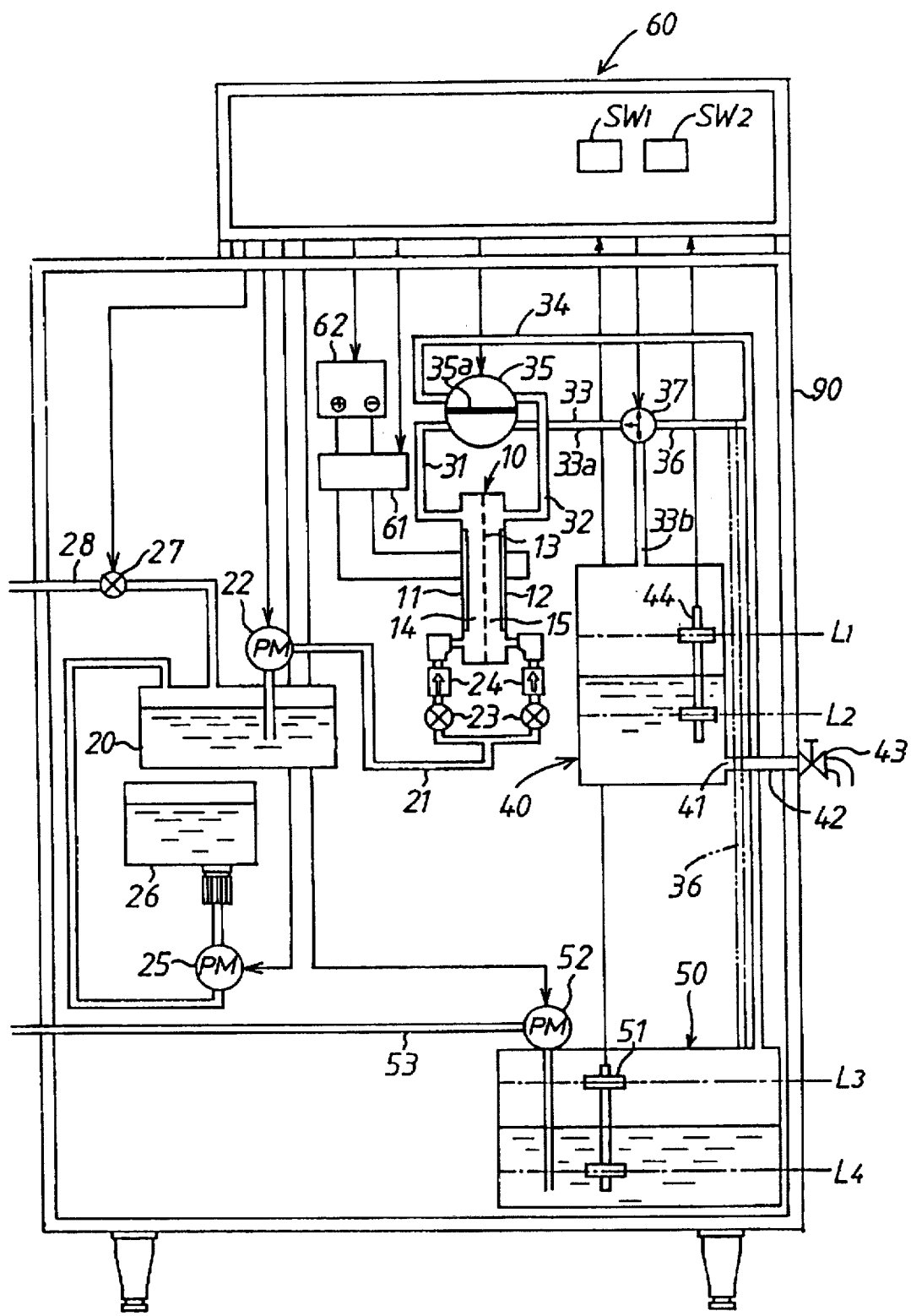
FIG. 1 is a schematic illustration of a production system of electrolyzed ion water in accordance with the present invention.

In FIG. 1 of the drawings, there is schematically illustrated a preferred embodiment of a production system of electrolyzed ion water in accordance with the present invention. The production system includes an electrolyzer 10 the interior of which is subdivided into electrode chambers 14 and 15 by means of a cation permeable diaphragm 13, a brine supply circuit for supplying diluted brine of 0.05–0.14% concentration into the electrolyzer 10, and a discharge circuit for introducing acid ion water and alkaline ion water produced in the electrode chambers 14 and 15 into an acid ion water tank 40 and an alkaline ion water tank 50. The electrolyzer 10 includes a pair of opposed electrodes 11 and 12 respectively disposed in the electrode chambers 14 and 15. The brine supply circuit includes a brine supply conduit 21 connecting a diluted brine tank 20 to the electrode chambers 14 and 15 of the electrolyzer 10. The brine supply conduit 21 is provided with an electric brine supply pump 22 which is operated under control of an electronic controller 60 to supply the diluted brine into the electrode chambers 14 and 15 of electrolyzer 10, a pair of flow control valves 23 which are manually adjusted to control the supply quantity of diluter brine and a pair of flow-meters 24 which are arranged to measure and indicate the quantity of diluted brine supplied into the electrode chambers 14 and 15 through the flow control valves 23. With the flow control valves 23, the quantity of each diluted brine supplied into the electrode chambers 14 and 15 is adjusted to be maintained in the same amount.

The diluted brine tank 20 is provided with a concentration sensor (not shown) for detecting concentration of the diluted brine stored in tank 20 and for applying an electric signal indicative of the detected concentration to the controller 60, and a liquid surface level sensor (not shown) for detecting the fact that the level of diluted brine has dropped below a lower limit level or risen over an upper limit level and for applying an electric signal indicative of the level of diluted brine in tank 20 to the controller 60. In response to the electric signals from the sensors, the controller 60 controls operation of an electric motor 25 to supply saturated brine into the diluted brine tank 20 from a saturated brine tank 26 and controls operation of an electromagnetic water supply valve 27 to supply fresh water into the diluted brine tank 20 from an external source of water through a water service conduit 28 so that the level of diluted brine is maintained at a predetermined level. The saturated brine tank 26 is in the form of a storage tank of the cartridge type detachable in a vertical direction for replacement and filled with an amount of saturated brine of predetermined concentration.

The electrodes 11 and 12 in the electrolyzer 10 are respectively connected to positive and negative electrodes of a power source circuit 62 through a polarity changeover device 61. The polarity changeover device 61 and power source circuit 62 are operated under control of the controller 60. The polarity changeover device 61 includes an electromagnetic relay which connects the positive and negative electrodes of power source circuit 62 to the electrodes 11 and 12 of electrolyzer 10 respectively when it is maintained in a deactivated condition and connects the negative and positive electrodes of power source circuit 62 to the electrodes 11 and 12 of electrolyzer 10 respectively when it is maintained in an activated condition. The power source circuit 62 is designed to convert AC voltage to DC voltage of a predetermined value. When applied with an Off signal from the controller 60, the power source circuit 62 acts to make DC voltage between the positive and negative electrodes zero. When applied with an ON signal from the controller 60, the power source circuit 62 acts to apply DC voltage of the predetermined value between the positive and negative electrodes.

The discharge circuit includes a pair of discharge conduits 31 and 32 for discharging therefrom electrolyzed ion water produced in the electrode chambers 14 and 15 of electrolyzer 10, an acid ion water introduction conduit 33 and an alkaline ion water introduction conduit 34 arranged to be selectively connected to the discharge conduits 31 and 32, an electrically operated first changeover valve 35 disposed within a connection portion of the discharge conduits 31, 32 and introduction conduits 33, 34 to connect the discharge conduit 31 to the introduction conduit 33 or 34 and to connect the discharge conduit 32 to the introduction conduit 34 or 33, a bifurcated conduit 36 connected at its one end to an intermediate portion of introduction conduit 33 and at its other end to an intermediate portion of introduction conduit 34, and an electrically operated second changeover valve 37 disposed within a connection portion of the intermediate portion of introduction conduit 33 and the bifurcated conduit 36 to connect an upstream portion 33a of the introduction conduit 33 to a downstream portion 33b or the bifurcated conduit 36.

The first changeover valve 35 is switched over under control of the controller 80 in such a manner that a rotary member 35a of valve 35 is retained in a first position at a production mode of ion water where acid ion water is discharged from the discharge conduit 31 while alkaline ion water is discharged from the discharge conduit 32 and that the rotary member 35a of valve 35 is turned at ninety degrees from the first portion and retained in a second position at a cleaning mode of the electrodes 11 and 12 where alkaline ion water is discharged from the discharge conduit 31 while acid ion water is discharged from the discharge conduit 32. Thus, the introduction conduit 33 is constantly supplied with the acid ion water from the discharge conduit 31 or 32, while the introduction conduit 34 is constantly supplied with the alkaline ion water from the discharge conduit 32 or 31. The second changeover valve 37 is switched over under control of the controller 60 to connect the upstream portion 33a of introduction conduit 33 to the downstream portion 33b at the production mode of ion water and to connect the upstream portion 33a of introduction conduit 33 to the bifurcated conduit 36 at a cleaning mode of the conduits. During deactivation of the production system, the first changeover valve 35 is retained in the first position, and the second changeover valve 37 is retained in a position to connect the upstream portion 33a of introduction conduit 33 to the downstream portion 33b.

The acid ion water tank 40 is arranged to store the acid ion water supplied from the introduction conduit 33. The acid ion water tank 40 is formed at its lower portion with a drain port 41 connected to a drain conduit 42 which is extended outwardly from a right-hand side panel of the system housing body 90 and is provided with a drain cock 43. The acid ion water tank 40 is provided with a liquid surface level sensor 44 which is arranged to detect upper and lower limit levels L1 and L2 of the acid ion water in tank 40. When applied with an electric signal from the liquid surface level sensor 44, the controller 60 acts to stop or restart operation of the system at the production mode of ion water.

The alkaline ion water tank 50 is larger in volume than the acid ion water tank 40. The alkaline ion water tank 50 is arranged to store the alkaline ion water supplied from the introduction conduit 34 at the production mode of ion water and to store the acid ion water supplied from the introduction conduit 34 at the cleaning mode of the conduits and the alkaline ion water supplied from the upstream portion 33a of introduction conduit 33 through the second changeover valve 37, bifurcated conduit 36 and introduction conduit 34. The alkaline ion water tank 50 is provided with a liquid surface level sensor 51 and an electric discharge pump 52.

The liquid surface level sensor 51 is arranged to detect upper and lower limit levels L3 and L4 of ion water in tank 50 for applying an electric signal indicative of the detected level of ion water to the controller 60. When applied with the electric signal from the liquid surface level sensor 51, the controller 60 acts to activate or deactivate the discharge pump 52. The electric discharge pump 52 is activated under control of the controller 60 to discharge the ion water from the alkaline ion water tank 50 through a discharge conduit 53. The discharge conduit 53 is connected to a drain conduit (not shown) outside a left-hand side panel of the system housing body 90.

The controller 60 is comprised of a microcomputer which includes first control means for controlling each operation of the electric pump 25 and water supply valve 27 in response to electric signals applied from the brine concentration sensor and liquid surface level sensor of the diluted brine tank 20 and second control means for controlling each operation of the brine supply pump 22, polarity changeover device 61, power source circuit 62, first and second changeover valves 35 and 37 and discharge pump 52 in response to electric signals applied from the liquid surface level sensors 44, 51 of the ion water tanks 40, 50 and in response to each operation of a production mode switch SW1 for production of ion water and a cleaning mode switch SW2 for cleaning the conduits in the system.

Assuming that in the production system of electrolyzed ion water, the production mode switch SW1 has been turned on, the controller 60 activates the brine supply pump 22 to supply diluted brine into the electrode chambers 14 and 15 of electrolyzer 10 from the diluted brine tank 20 and applies an ON signal to the power source circuit 62 so that DC voltage between the negative and positive electrodes of power source circuit 62 becomes a predetermined value in a condition where the polarity changeover device 61 is maintained in a deactivated condition. As a result, the positive electrode of power source circuit 62 is connected to the electrode 11 of electrolyzer 10, while the negative electrode of power source circuit 61 is connected to the electrode 12 of electrolyzer 10. In this instance, acid ion water of a predetermined pH is produced by electrolysis of the brine in the electrode chamber 14 and supplied into the acid ion water tank 40 through the discharge conduit 31, first changeover valve as and introduction conduit 33, while alkaline ion water is produced by electrolysis of the brine in the electrode chamber 15 and supplied into the alkaline ion water tank 50 through the discharge conduit 32, first changeover valve 35 and introduction conduit 34. Thus, the acid ion water stored in tank 40 can be utilized in an appropriate manner by opening the outlet cock 43.

When the level of acid ion water in tank 40 rises up to the upper limit level L1, the controller 60 deactivates the brine supply pump 22 in response to an electric signal from the liquid surface level sensor 44 and applies an OFF signal to the power source circuit 61 to make the DC voltage between the positive and negative electrodes zero. This causes the production system to stop production of the ion water. When the level of acid ion water in tank 40 drops below the lower limit level L2 by consumption of the acid ion water, the controller 60 activates the brine supply pump 22 in response to an electric signal from the liquid surface level sensor 44 and applies an ON signal to the power source circuit 61 so that the DC voltage of the predetermined value is applied between the positive and negative electrodes of power source circuit 61 to restart production of the ion water. When the level of alkaline ion water in tank 50 rises up to the upper limit level L3 during production of the ion water, the controller 60 activates the discharge pump 52 in response to an electric signal from the liquid surface level sensor 51 to discharge the alkaline ion water from tank 50 through the discharge conduit 53. When the level of alkaline ion water in tank 50 drops below the lower limit level L4, the controller 60 deactivates the discharge pump 52 in response to an electric signal from the liquid surface level sensor 51.

Assuming that the operation of the system at the production mode of ion water has continued for a predetermined time (for instance, two hours) measured by a time in the controller 60, the controller 60 applies an OFF signal to the power source circuit 62 to make the DC voltage between the positive and negative electrodes of power source circuit 62 zero and switches over the second changeover valve 37 to connect the upstream portion 33a of introduction conduit 33 to the bifurcated conduit 36. In this instance, the polarity changeover device 61 is activated under control of the controller 60 to connect the negative electrode of power source circuit 62 to the electrode 11 of electrolyzer 10 and to connect the positive electrode of power source circuit 62 to the electrode 12 of electrolyzer 10, and the first changeover valve 35 is switched over under control of the controller 60 to connect the discharge conduit 31 to the introduction conduit 34 and to connect the discharge conduit 32 to the introduction conduit 33. In such a condition, the power source circuit 62 is applied with an ON signal from the controller 60 so that the DC voltage of the predetermined value is applied between the positive and negative electrodes. Thus, alkaline ion water is produced by electrolysis of the brine in the electrode chamber 14 and supplied into the alkaline ion water tank 50 from the discharge conduit 31 through the first changeover valve 35 and the introduction conduit 34, while acid ion water is produced by electrolysis of the brine in the electrode chamber 15 and supplied into the alkaline ion tank 50 from the discharge conduit 32 through the first changeover valve 35, the upstream portion 33a of introduction conduit 33 and the bifurcated conduit 36. In this instance, contaminants such as calcium, sodium, etc. adhered to the electrodes 11 and 12 are eliminated by inverse application of the DC voltage without causing entry of the contaminated ion water into the acid ion water tank 40, and the electrode 12 in the electrode chamber 15 is prevented from brittle damage caused by hydrogen ion remained in its circumference at an initial stage of inverse application of the DC voltage. After lapse of a predetermined time (for instance, three minutes) in operation of the system at the cleaning mode of the electrodes 11 and 12, the changeover valve 37 is switched over to connect the upstream portion 33a of introduction conduit 33 to the downstream portion 33b thereby to introduce the acid ion water into the acid ion water tank 40.

The operation of the system at the cleaning mode of the electrodes 11 and 12 is conducted upon each lapse of the predetermined time unless the production mode switch SW1 is turned off. Thus, the electrodes 11 and 12 of electrolyzer 10 are electrically cleaned by inverse application of the DC voltage, and the discharge conduit 32 is cleaned by the acid ion water supplied thereto from the electrode chamber 15. When the production mode switch SW1 is turned off, the controller 60 deactivates the brine supply pump 22 and applies an OFF signal to the power source circuit 62 so that the DC voltage between the positive and negative electrodes becomes zero. In this instance, the controller 60 deactivates the polarity changeover device 61 and retains the first changeover valve 35 in the first position, and the timer in the controller 60 is reset.

When the cleaning mode switch SW2 is turned on during operation of the system at the production mode of ion water, the polarity changeover device 61 is activated under control of the controller 60 if it is maintained in a deactivated condition or deactivated if it is maintained in an activated condition, and the second changeover valve 37 is switched over under control of the controller 60 to connect the upstream portion 33a of introduction conduit 33 to the bifurcated conduit 36. Then, alkaline ion water is produced in the electrode chamber 14 of electrolyzer 10 and supplied into the alkaline ion water tank 50 through the discharge conduit 31, changeover valve 35, introduction conduit 33, bifurcated conduit 36 and introduction conduit 34, while acid ion water is produced in the electrode chamber 15 of electrolyzer 10 and supplied into the alkaline ion water tank 50 through the discharge conduit 32, changeover valve 35 and introduction conduit 34. As a result, contaminants adhered to the discharge conduit 32 and introduction conduit 34 during operation of the system at the production mode of ion water are dissolved and eliminated by the acid ion water to maintain each passage of the discharge conduit 32 and introduction conduit 34 in an adequate diameter, while contaminants adhered to the discharge conduit 31, introduction conduit 33 and bifurcated conduit 36 are dissolved and eliminated by the alkaline ion water. This is useful to eliminate trouble for replacement of the introduction conduit 34. When the cleaning mode switch SW2 is turned off, the polarity changeover device 61 is returned to the previous condition at the production mode of ion water. After lapse of three minutes, the second changeover valve 37 is returned to the previous position at the production mode of ion water, and the timer in the controller 60 is reset.

Figure 2:
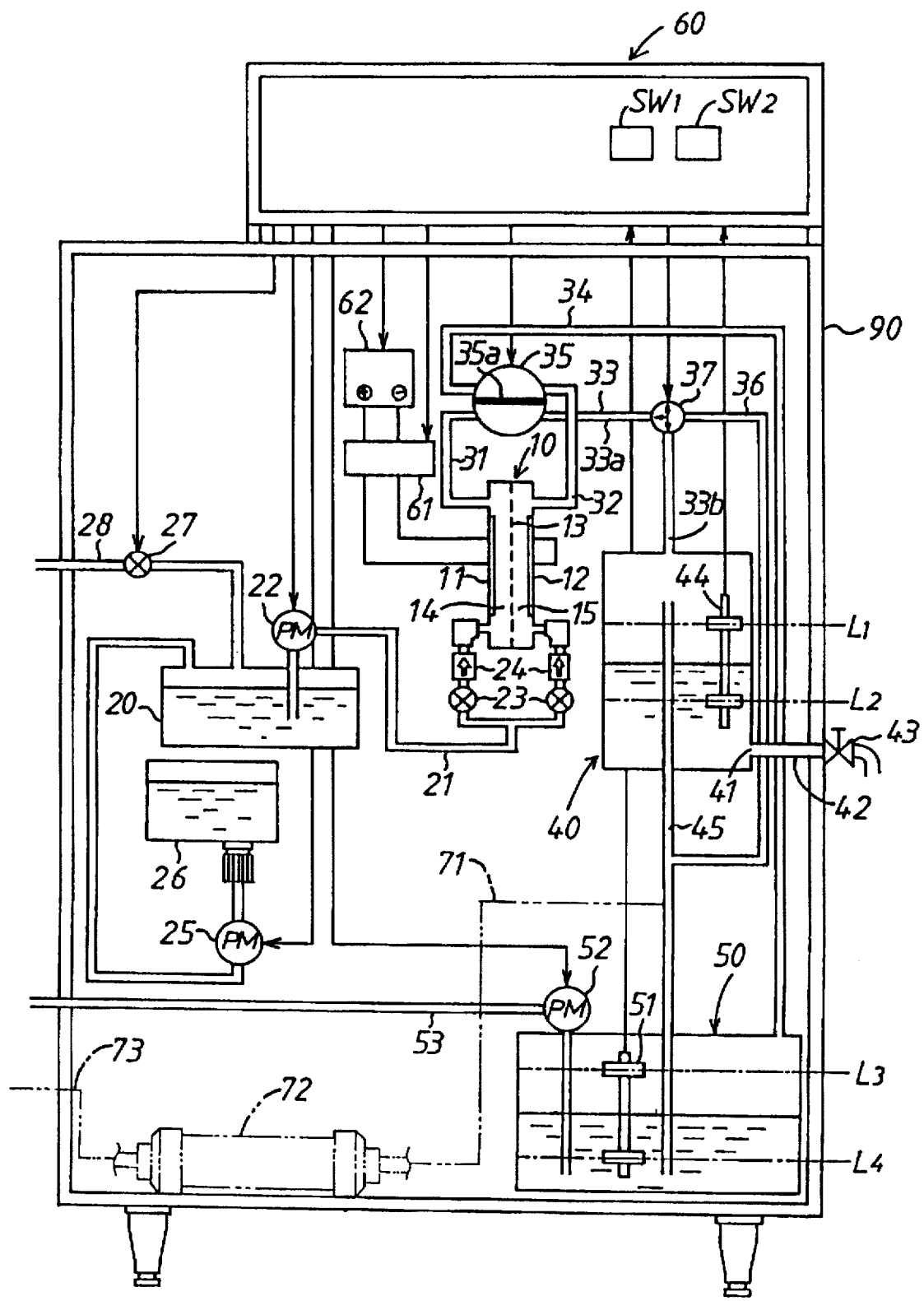
FIG. 2 is a schematic illustration of a modification of the production system of electrolyzed ion water shown in FIG. 1.

Although in the production system, the bifurcated conduit 36 has been connected at its one end to the upstream portion 33a of introduction conduit 33 and at its other end to the intermediate portion of introduction conduit 34, the bifurcated conduit 36 may be connected at its other end to the alkaline ion water tank 50 as shown by imaginary lines in FIG. 1. Alternatively, as shown in FIG. 2, the bifurcated conduit 86 may be connected at its other end to an overflow pipe 45 which has an upper opening end located above the upper limit level L1 in the acid ion water tank 40 and a lower opening end located below the liquid surface of ion water in the alkaline ion water tank 50. In such arrangement of the bifurcated conduit 36, only the acid ion water is discharged into the alkaline ion water tank 50 through the introduction conduit 34 at the conduit cleaning mode to clean the entirety of introduction conduit 34. On the other hand, the overflow pipe 45 is useful to discharge an excessive amount of acid ion water from the acid ion water tank 40 into the alkaline ion water tank 50 and to exhaust chlorine gas accumulated in the upper space of acid ion water tank 40. In addition, as shown by an imaginary line in FIG. 2, a bypass conduit 71 may be connected at its one end to an intermediate portion of overflow pipe 45 and at its other end to a chlorine absorption filter 72 to discharge exhaust gas therethrough to the exterior.

Although in the embodiment, the polarity changeover device 61 and second changeover valve 37 are switched over in response to operation of the cleaning mode switch SW2, the first and second changeover valves 35 and 37 may be switched over in response to operation of the cleaning mode switch SW2 to discharge acid ion water into the introduction conduit 34 from the discharge conduit 31 and to discharge alkaline ion water into the upstream portion 33a of introduction conduit 33 and bifurcated conduit 36 from the discharge conduit 32.

Although in the embodiment, the operation of the system at the conduit cleaning mode has been effected by operation of the cleaning mode switch SW2, the controller 60 may be provided with a cleaning timer for controlling the operation of the cleaning mode switch SW2. Although in the embodiment, the production system has been adapted to electrolyze brine prepared by dissolution of water-soluble salt such as table salt, the production system may be adapted to electrolyze fresh pure water. In such a case, the fresh pure water is supplied into the electrolyzer 10 directly from the service water supply conduit 28 under control of the water supply valve 27.

Figure 3:
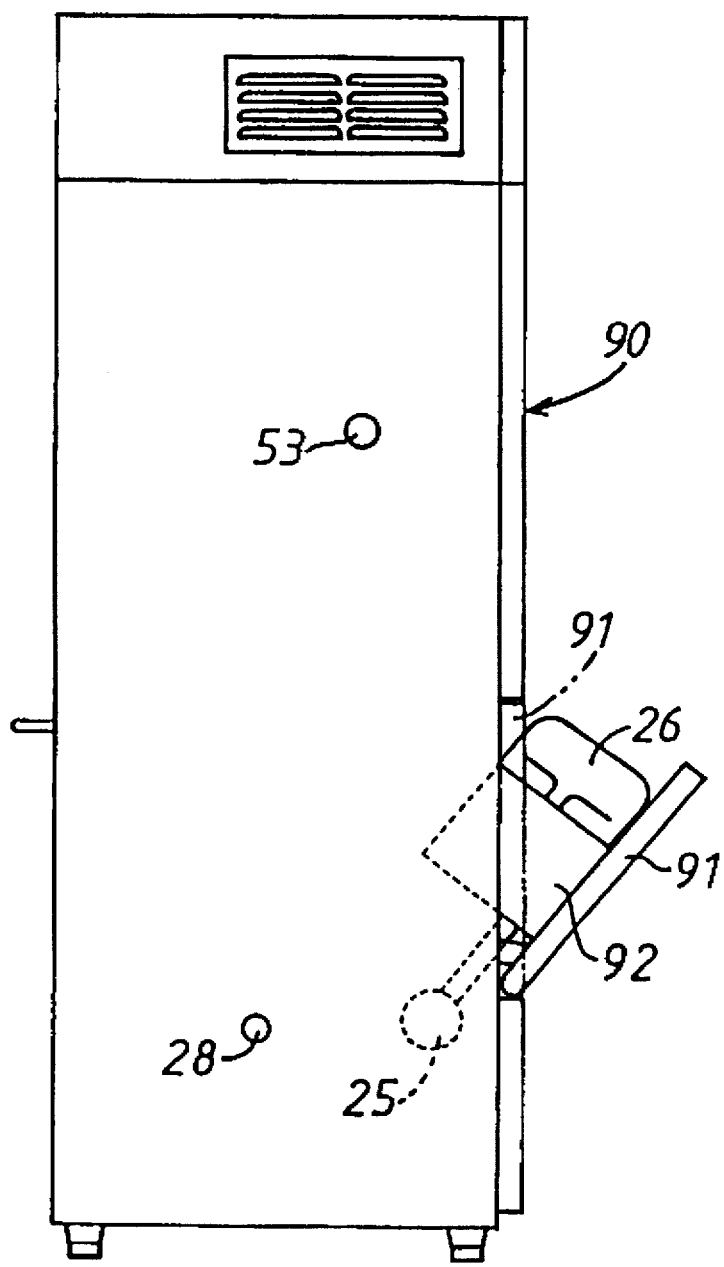
FIG. 3 is a side view of a saturated brine tank assembled with a housing body of the production system shown in FIGS. 1 and 2.

Although in the embodiment, the service water supply conduit 28 and discharge conduit 53 have been extended outwardly through the left-hand side panel of the system housing body 90 while the outlet conduit 42 has been extended outwardly through the right-hand side panel of the system housing body 90, the conduits 28, 53 and 42 may be arranged adjacent to one another and extended outwardly through the left-hand or right-hand side panel of the system housing body 90 to facilitate piping work of the conduits. In addition, as shown in FIG. 3, the saturated brine tank 26 may be detachably mounted on a holder 92 which is assembled with the back side of a door 91 mounted on the front panel of the system housing body 90 to be opened downward. In such arrangement of the saturated brine tank 26, the electric motor 22 is assembled with the holder 92 of door 91 to supply saturated brine from the brine tank 26 into the diluted brine tank 20, and the saturated brine tank 26 is replaced with a fresh one at the front of the system housing body 90 in a simple manner.

What is claimed is:

1. A production system of electrolyzed ion water, comprising an electrolyzer the interior of which is subdivided into first and second electrode chambers by means of a cation permeable diaphragm, wherein said electrolyzer is provided with first and second electrodes respectively disposed in the first and second electrode chambers, a first discharge conduit connected to the first electrode chamber to discharge ion water produced by electrolysis of water in the first electrode chamber, a second discharge conduit connected to the second electrode chamber to discharge ion water produced by electrolysis of water in the second electrode chamber, and wherein the production system comprises:

first and second introduction conduits arranged to be selectively connected to the first and second discharge conduits;

an electrically operated first changeover valve disposed within a connection portion of the first and second discharge conduits, such that the first and second introduction conduits can be switched over between a first position in which the first and second discharge conduits are respectively connected to the first and second introduction conduits and a second position in which the first discharge conduit is connected to the second introduction conduit while the second discharge conduit is connected to the first introduction conduit;

polarity changeover means for switching over polarity of DC voltage applied to the electrodes of said electrolyzer; and control means for maintaining said first changeover valve in the first position and said polarity changeover means in a deactivated condition at a production mode of ion water so that acid ion water is produced in the first electrode chamber and discharged into the first introduction conduit from the first discharge conduit while alkaline ion water is produced in the second electrode chamber and discharged into the second introduction conduit from the second discharge conduit, means for switching over said first changeover valve from the first position to the second position and activating said polarity changeover means upon each lapse of a time period during operation at the production mode of ion water so that alkaline ion water is produced in the first electrode chamber and discharged into the second introduction conduit from the first discharge conduit while acid ion water is produced in the second electrode chamber and discharged into the first introduction conduit from the second discharge conduit, and means for switching over said changeover valve from the first position to the second position or activating said polarity changeover means at a cleaning mode of the conduits so that acid ion water is discharged into the second introduction conduit while alkaline ion water is discharged into the first introduction conduit.

2. A production system of electrolyzed ion water as claimed in claim 1, further comprising an electrically operated second changeover valve to be switched over between a first position in which the first introduction conduit is connected to a first storage tank of acid ion water and a second position in which the first introduction conduit is connected to a second storage tank of alkaline ion water, wherein said control means includes means for maintaining said second changeover valve in the first position during operation at the production mode of ion water, means for switching over said second changeover valve from the first position to the second position and maintaining it in the second position for a time period when said first changeover valve is switched over from the first position to the second position in a condition where said polarity changeover means has been activated during operation at the production mode of ion water, and means for switching over said second changeover valve from the first position to the second position and maintaining it in the second position when only said first changeover valve is switched over from the first position to the second position or only said polarity changeover means is activated at the cleaning mode of the conduits.

3. A production system of electrolyzed ion water as claimed in claim 2, wherein the second introduction conduit is connected to said storage tank of alkaline ion water, and wherein said second changeover valve is arranged to connect the first introduction conduit to an intermediate portion of the second introduction conduit when it is retained in the second position.

* * * * *